Nov. 9, 1965   D. J. SWEIGART ETAL   3,216,120
PROFILOMETER ASSEMBLY
Filed Sept. 5, 1963   3 Sheets-Sheet 1
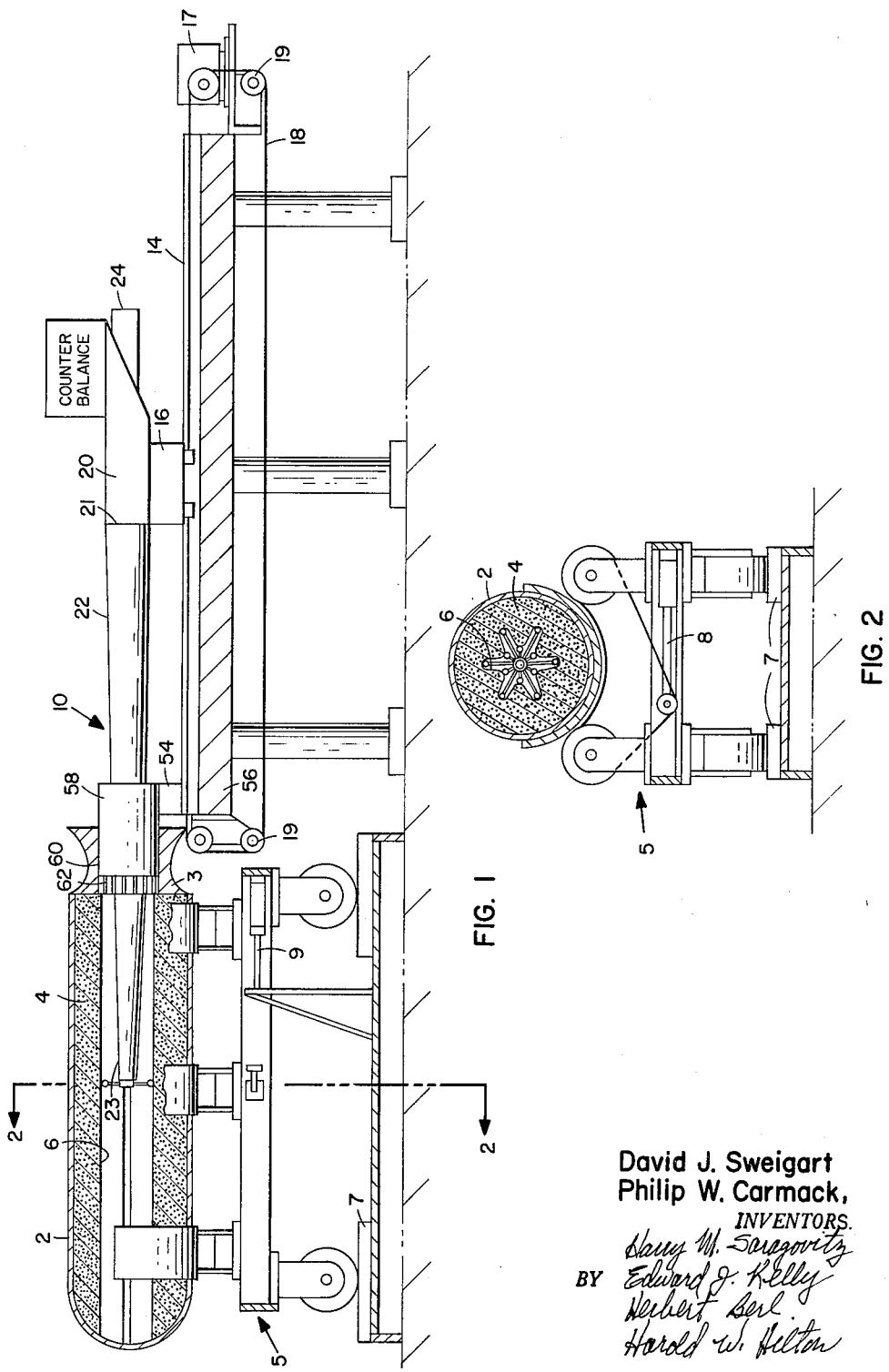
David J. Sweigart
Philip W. Carmack,
INVENTORS.
BY Harry M. Saragovitz
Edward J. Kelly
Herbert Berl
Harold W. Hilton Nov. 9, 1965  D. J. SWEIGART ETAL  3,216,120
PROFILOMETER ASSEMBLY
Filed Sept. 5, 1963  3 Sheets-Sheet 2
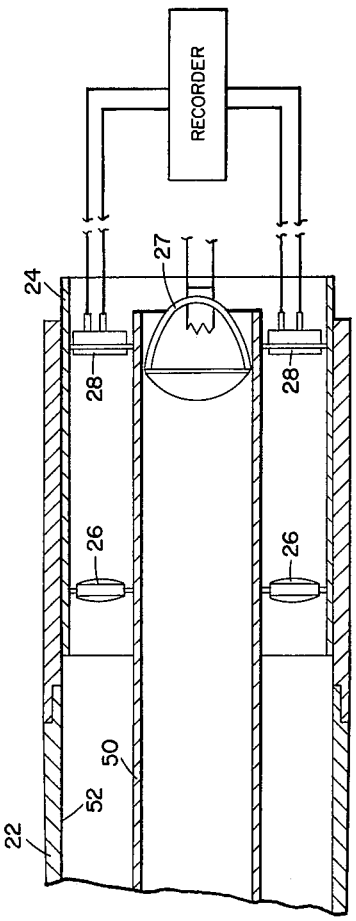
FIG. 3
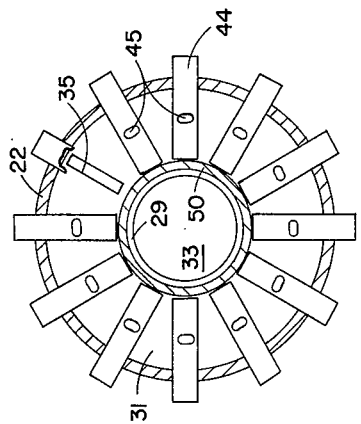
FIG. 4
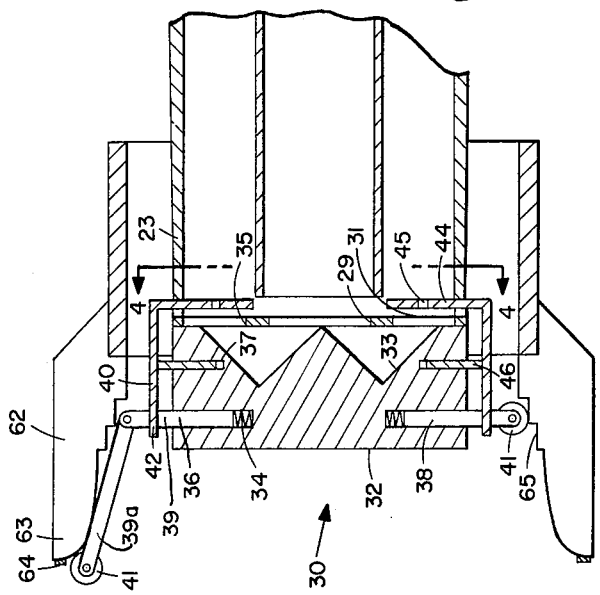
David J. Sweigart
Philip W. Carmack,
INVENTORS.

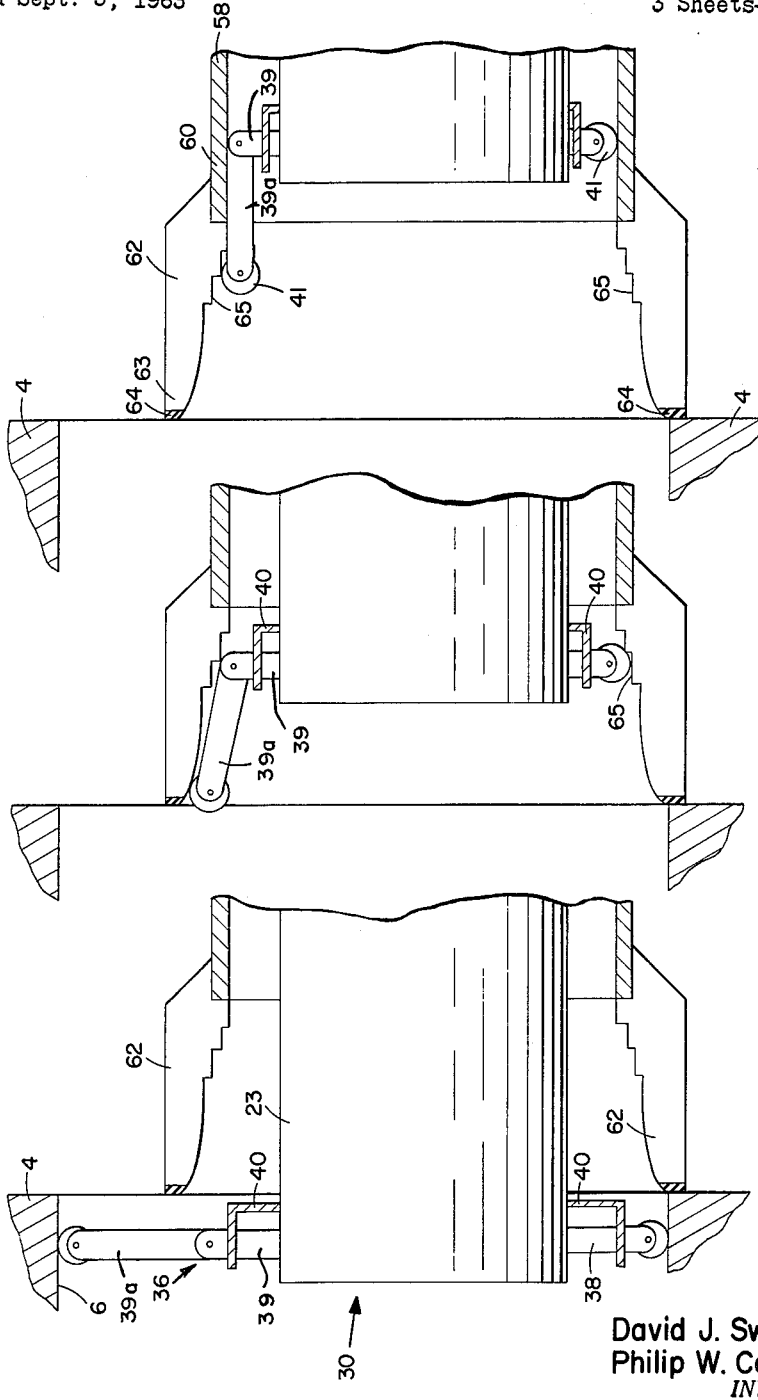

United States Patent Office 3,216,120
Patented Nov. 9, 1965

3,216,120
PROFILOMETER ASSEMBLY
David J. Sweigart and Philip W. Carmack, Huntsville, Ala., assignors to the United States of America as represented by the Secretary of the Army
Filed Sept. 5, 1963, Ser. No. 306,964
(Granted under Title 35, U.S. Code (1952), sec. 266)
15 Claims. (Cl. 33—174)

The invention described herein may be manufactured and used by or for the Government for governmental purposes without the payment of any royalty thereon.

This invention relates to profilometers and more particularly to an improved profilometer for use in inspecting the internal longitudinal profile of the grain cavity of a relatively large solid propellant motor.

Previous profilometers designed to measure one or two elements of the grain cavity, monitored the strain of a cantilevered flat spring as it was drawn across the grain profile. The spring being fixed to a carriage driven by a power screw along a track. Errors of a relatively large magnitude were introduced by this system as any deviation of carriage travel from a straight line or any boom sway or bounce was expressed as a change in the internal radius of the solid propellant motor. Such profilometers were also lacking the facility of measuring several radial elements as would be found, for example, in a solid propellant motor having a six pointed star configuration. For such a configuration, several passes of the profilometer had to be made through the grain cavity.

The present invention overcomes these difficulties by providing a boom type profilometer utilizing a plurality of radially extending spring biased probe elements to indicate the surface of the propellant grain adjacent the grain cavity in a single pass. Also utilized in the profilometer are light sensitive elements which are disposed to emit a recordable signal commensurate with probe movement. The use of such light sensitive elements has the safety feature of eliminating the introduction of any heat or electrical energy into the grain cavity while allowing accurate indicating of grain surface under environmental conditions, as for example, a temperature range of approximately −40° F. to 125° F. In addition, the use of such light sensitive elements allows indication of the grain profile to proceed in a manner which is independent of the force exerted on the grain surface by the probes through boom sway and bounce.

For purposes of illustration, an embodiment of the invention will be described herein which is able to indicate a grain cavity having a six-pointed star configuration. For such grain cavity configuration, six probe elements indicate the six star points and six probe elements indicate the grain surface forming the bases of the six star points.

Accordingly, it is an object of this invention to provide a profilometer which can measure many radial elements simultaneously.

Another object is to provide a profilometer which substantially reduces the time required for profile determination.

Still another object is to provide a profilometer in which neither electrical energy or heat is introduced into the grain cavity during the measuring operation.

A further object of this invention is to provide a profilometer which allows a predetermined radial reference dimension to be established as a portion of each run.

A still further object is to provide for the direct determination of grain profile independent of the deflected configuration of the implementing structure.

A yet further object is to provide a boom type profilometer giving a picture of grain profile which is free of errors due to boom sway and bounce.

These and other objects of the invention will become more apparent upon consideration of the following detailed description and accompanying drawings, in which:

FIGURE 1 is a sectional view of a solid propellant motor having the profilometer of the present invention inserted in the grain cavity of the motor for testing thereof;

FIGURE 2 is a view taken along line 2—2 of FIGURE 1;

FIGURE 3 is a foreshortened view of the profilometer boom;

FIGURE 4 is a view taken along line 4—4 of FIGURE 3; and

FIGURE 5a is a sectional view of the solid propellant motor and showing the probes of the profilometer prior to insertion into the grain cavity of the motor.

FIGURE 5b is a view similar to FIGURE 5a illustrating means for guiding the probes into the propellant grain cavity.

FIGURE 5c is a view similar to FIGURE 5a illustrating the probes in engagement with the propellant grain.

Referring to the drawings, FIGURES 1 and 2 show the preferred embodiment of this invention to include a rocket motor carrying cradle 5 and a profilometer 10. The cradle rides on a trackway 7 and is provided with both hydraulic powered rotational and transitional facilities 8 and 9 respectively.

The profilometer comprises a fixed ways bed 14 in aligned relationship with trackway 7. A carriage 16 is slideably mounted on the ways bed and is powered by a motor 17 through a system of belts 18 and pulleys 19. The top of the carriage carries a steel cylinder 20 to which is rigidly attached the aft end 21 of a hollow, tapered boom 22 which is disposed in cantilevered relationship with cylinder 20. Disposed within cylinder 20 is a removable cylindrical section 24 (FIGURE 3) which houses a light source 27, twelve circumferentially spaced focusing lenses 26 and twelve Photopots 28 for purposes explained hereinbelow.

The Photopots 28 are similar in characteristics to the Giannani solid-state potentiometer described on page 28 of the April 30, 1962 issue of "Missiles and Rockets." Photopot is the trade name of the Giannani solid-state potentiometer and consists of a photoconductive crystal having a resistive film strip and a non-resistive collector disposed thereon in spaced parallel relation. Voltage applied to the resistive strip is divided by light falling upon the photoconductive crystal through the photoconductive gap which separates the parallel edges of the collector and resistive film strip. A light beam serves as an electrical connection only at that position where it connects (engages) the resistive and conductive strips. The Photopot serves as a linear position sensor by providing an output voltage which is a linear function of light beam displacement on the crystal.

The free or forward end 23 of boom 22 mounts an enclosed spider housing 30 disposed for movement into the grain cavity of a rocket motor. FIGURES 3 and 4 show the spider housing 30 to have inner face 31 provided with a centrally located opening 29 for admitting into the housing that light emitting from light source 27. A prism block 32 is mounted in housing 30 and is disposed to reflect the light from source 27. Twelve radial slots 35 are provided in the inner face to allow for the escape of reflected light from the housing. Reflected light is allowed to escape from the spider housing only through these slots, one of each radial slot being in aligned relationship with one of each lens and Photopot.

Prism block 32 is provided with a reflecting, double-cone-shaped inner face 33. The double-cone-shaped configuration of the prism's reflecting surface allows incident light entering the spider housing from opening 29 to be reflected out through the radial slots 35 to the lenses and Photopots (FIGURE 3). To serve as a means for support of light source 27 and to isolate the incident light from the reflected light there is provided a tubular section 50, mounted concentrically within boom 22 and extending substantially the length of the boom. The disposition of the tubular section within the boom defines an annular space 52 therebetween extending substantially the length of boom 22 and cylindrical section 24.

The prism block contains twelve radially spaced probe bores 34 and an equal number of radially spaced guide pin bores 37. Spring biased from the probe bores are alternately placed star-point probes 36 and star-base probes 38. Each of the probes 36 and 38 has a roller fixed to the end thereof to allow the probes to pass smoothly over the propellant grain surface. Star-point probes 36 include a base portion 39 carried in alternate ones of probe bores 34 and an upper arm 39a which is hinged to base portion 39. Roller 41 is secured to arm 39a of star-point probe 36.

To base portion 39 of probe 36 and to probe 38 is attached one leg 42 of a corresponding L-shaped aperture plate 40. While each aperture plate is allowed radial movement commensurate with the radial movement of probes 36 and 38, any rotational movement about the probes is prevented by guide pins 46 slideably disposed in guide pin bores 37 and fixed to leg 42 of each aperture plate. The second leg 44 of each plate extends radially inward to cover a corresponding radial slot 35 of the inner face 31 of the spider housing. Each leg 44 is provided with a slit 45 therethrough to convey light reflecting from the prism surface 33 through leg 44.

As stated hereinabove, the spider housing is disposed for movement into the grain cavity of a solid fuel rocket motor. To facilitate the movement of the spider into the grain cavity, a manually movable carriage 54 is mounted on one end 56 of the ways bed adjacent the rocket motor carrying cradle 5 (FIGURE 1). Carriage 54 mounts a cylindrical foreshortened boom 58. The forward end 60 of boom 58 is adapted to extend through the nozzle of a rocket motor to the solid propellant. Fitted to forward end 60 are an appropriate number of circumferentially spaced calibration cams 62 disposed to guide probes 36 and 38 onto the propellant surface. Each calibration cam has a resilient bumper material 64 affixed to the ends 63 thereof to prevent damage to the propellant grain (FIGURE 5). In addition each cam has a set of steps 65 cut therein. The radial distances formed by these steps are known quantities and, as will be explained hereinbelow, aid in establishing a reference prior to the actual indicating of the grain surface.

In setting up the profilometer for operation, motor driven carriage 16 and manually movable carriage 54 are both located in an aft position on ways bed 15. A solid propellant motor 2 is then placed on cradle 5. For purposes of illustration, FIGURE 1 shows the solid fuel motor to include a nozzle 3, a propellant grain 4 and a six pointed star-shaped grain cavity 6.

Hydraulic powered transitional facilities 9 move the cradle on track 7 to the proximity of the ways bed 14. Carriage 54 is then manually moved forward on the ways bed until calibration boom 58 extends into motor nozzle 3 and adjacent the propellant grain 4. The hydraulic powered rotational facilities 8 are then actuated to rotate the rocket motor on the cradle. Rotation of the rocket motor proceeds until an aligned relationship is achieved between calibration cams 62 and the corresponding star points and start point bases of the grain cavity. Boom 58 is then moved manually until a contact is made between the resilient bumpers 64 and propellant grain 4 (FIGURE 5).

Spider carrying boom 22 is then moved forward to pass into the calibration boom 58. Relatively long star-point probes 36 are accommodated in the calibration boom by being bent forward at their hinge point. Both probes 36 and 38 are retained depressed against the spring bias in bores 34 by the cylindrical wall of calibration boom 58 (FIGURE 5a). With the elements of the profilometer assembly in the above arrangement, calibration of the propellant surface adjacent the grain cavity can begin.

In operation, conventional hydraulic equipment (not shown) is actuated to force a thin film of lubricating oil between the sliding surface of carriage 16 and the ways bed. The oil film allows relatively friction free carriage motion. Motor 17 is then actuated by any conventional means (not shown) to drive the belt and pulley system. The belt in turn drives carriage 16 toward the forward end of the ways bed to carry the boom 22 and spider housing through calibration boom 58 and into the grain cavity 6.

As the spider housing moves through boom 58, each probe element moves onto its respective calibration cam. Roller 41 of probe 38 contacts steps 65 of alternate ones of calibration cams 62. Simultaneously, the upper surface of base portion 39 contacts steps 65 of the remaining calibration cams 62. The probe elements, being spring biased, are extended radially in increments as each of the successive steps 65 is encountered. Radial movement of the probes causes commensurate motion of a corresponding aperture plate (FIGURES 5b and 5c). The disposition of an aperture leg 44 over each radial slot 35 limits the light reflected out from the spider housing to that light passing through slit 45. The escaping light is then focused by a corresponding lens 26 onto the sensing surface of a corresponding Photopot 28 (FIGURE 3). Therefore, as aperture plate motion is commensurate with probe motion, any radial movement of a probe will cause the focused image of a corresponding slit 45 to pivot about a respective lens 26, changing the position of the focused slit image on the Photopot surface. The radial distances formed by the steps 65 being known quantities, and Photopot output signals being a function of light displacement on its surface, a radial reference can be established as the probes move over the steps 65. The radial reference can be documented by recording the Photopots' output signals on any suitable recording means.

In continuing to extend boom 22 into the grain cavity, the probes 36 and 38 eventually pass over the calibration cams and contact the grain surface (FIGURE 5c). When probe 36 is in its extended position in contact with the grain surface, arms 39 and 39a act as a single probe element reciprocating against the action of spring 34. Probe 36 is kept in the extended position by any conventional means. As the run continues, any irregularity of grain surface can be detected and recorded in a similar manner to produce documentary evidence of any irregularities of the motor's grain surface. Bounce or sway of the boom tip may occur as a result of flexing of the boom tube; however, such movement will not effect the transducer reading. The beam of light entering the double-cone-shaped inner face 33 is reflected in rays which are parallel to the line of entry of the incident light. Since the probe is spring loaded in boom a certain amount of movement of the boom relative to the probe will not change the position of the exit slit. The light reflected from the cone through the exit slit is passing through the exit slit in parallel rays which floods the chamber, and not just a single ray. Therefore, direct movement of the probe and slit causes a change in the position of the light emerging through the slit and impinging on the Photopot to vary the ouput therefrom. However, since boom tip movement will not bring about a change in the radial position of the exit slit, boom tip motion will not effect the transducer reading. Therefore, any recorded evidence is a true picture of the grain profile unaltered by the introduction of errors due to boom sway and bounce.

When the boom 22 and spider housing have probed the full depth of the grain cavity, motor 17 is reversed by any conventional means (not shown) causing the boom to withdraw. As the probes 36 and 38 emerge from the cavity, the calibration cams 62 cause the probes to be depressed into their respective probe bores 34 thus allowing the calibration boom 54 to once again accommodate the probes.

Thus it can be seen that this invention provides a profilometer which is safe, easy to operate and which can provide a recorded, true indication of any grain irregularities of a relatively large solid propellant motor.

It is to be understood that although an embodiment for indicating a grain cavity having a six pointed star configuration is described, the invention is not limited to solid fuel motors of this type, but that various modifications of the profilometer described herein can be made without changing the spirit and scope of the invention as claimed.

We claim:

1. An improved profilometer for indicating the grain cavity of a large solid fuel rocket motor, said profilometer comprising:
   (a) a cradle for supporting and positioning said rocket motor;
   (b) a motor driven carriage spaced from and movable toward and from said cradle;
   (c) a hollow boom mated at its aft end to said carriage, the forward end of said boom being extendable into said grain cavity responsive to carriage motion;
   (d) a source of light carried in said boom adjacent said aft end;
   (e) light reflecting means located at the forward end of said boom and disposed for the return of light from said light source to said after end;
   (f) a plurality of radially extending depressable probe elements carried by the forward end of said boom for indicating the profile of said grain cavity;
   (g) a plurality of light varied potentiometers, one of each of said potentiometers corresponding to each of said probe elements, said light varied potentiometers mounted in said boom and isolated from said light source, each of said potentiometers disposed to receive on its surface said reflected light to provide an output signal which is a function of light displacement on its surface; and
   (h) light limiting means carried intermediate said reflecting means and said potentiometers and disposed for corresponding movement with said probes for admittance of a portion of said reflected light to the surface of said potentiometers to produce an output signal therefrom indicative of the profile of said grains cavity said portion being indicative of the displacement of said probes.

2. A device as set forth in claim 1 in which said cradle is provided with transverse and rotational facilities disposed for the alignment of said rocket motor with said profilometer.

3. A device as set forth in claim 1 including a ways bed having said carriage slideably mounted thereon, said bed being spaced from said cradle and in aligned relationship thereto.

4. A device as set forth in claim 3 including:
   (a) a manually moveable carriage carried by said ways bed adjacent the forward end of said boom;
   (b) a hollow calibration boom mounted on said manually moveable carriage and disposed circumferentially about said first mentioned boom, said first mentioned boom disposed to pass concentrically through said calibration boom; and
   (c) a plurality of calibration cams mounted on one end of said calibration boom and extending therefrom, said cams disposed to guide said probes onto the grain surface of said solid propellant motor.

5. A device as set forth in claim 4 including:
   (a) a spider housing carried on the forward end of said first mentioned boom and disposed for support therein of said probe elements, said light limiting means and said reflecting means; and
   (b) a backing plate carried in said housing and provided with a plurality of circumferentially spaced radial bores, said probe elements disposed in said bores and biased therein for reciprocal movement.

6. A device as set forth in claim 5 including a member secured to the forward end of said boom for substantial enclosure thereof and having a central bore therethrough for the admittance of incident light to said reflecting means, said member having a plurality of spaced radial slots for passage therethrough of the reflected light.

7. A device as set forth in claim 6 in which:
   (a) said light limiting means comprise a plurality of L-shaped aperture plates secured to corresponding ones of said probes for movement therewith; and
   (b) each of said plates having a first leg fixed to a corresponding probe element and a second leg extending over said member and provided with a slit in aligned relation with corresponding radial slots of said member for passage of reflected light.

8. A device as set forth in claim 7 including a tubular section disposed for support of said light source and disposed to isolate the incident light from the reflected light, said tubular section being in communication with said central bore through said member.

9. A device as set forth in claim 8 in which said reflecting means is a double reflecting cone providing for the return of reflected light to said aft end outside of said tubular section.

10. A device as set forth in claim 9 in which said potentiometers are circumferentially spaced about said tubular section, one of each potentiometers being disposed in aligned relationship with one of each of said probes.

11. A device as set forth in claim 10 including a plurality of lens elements disposed about said tubular section intermediate said member and said potentiometers, one of each said lenses being in aligned relationship with one of each aperture plate and Photopot, said lens elements disposed to focus the image of said slit on said potentiometer surface.

12. A profilometer for indicating the grain cavity of a solid fuel rocket motor, said profilometer comprising:
   (a) a hollow cylindrical boom disposed for movement into said grain cavity;
   (b) a spider housing carried by said boom on the forward end thereof for extension into said grain cavity,
   (c) radially extending probe elements carried by said housing and spring biased therefrom to bear against the surface of said grain cavity,
   (d) a plurality of light varied potentiometers arranged circumferentially within the aft end of said boom, one of each light varied potentiometer corresponding to one of each probe element,
   (e) a light source carried by said boom at the aft end thereof,
   (f) reflecting means located in said spider housing providing for the return of light from an aft located source to said potentiometers,
   (g) means for limiting said reflected light to a slit image, said means disposed for radial motion commensurate with the motion of a corresponding probe, and
   (h) lens elements disposed intermediate said limiting means and said potentiometers for focusing said slit image on said potentiometer.

13. A device as set forth in claim 12 in which said reflecting means comprises a double cone prism.

14. A device as set forth in claim 13 including:
   (a) a member carried in said housing for substantially covering the reflecting surface of said double cone prism and provided with a centrally located bore therethrough for the admittance of incident light to said prism and spaced radial slots providing an egress from said spider housing for reflected light, and (b) a tubular section disposed concentrically within said boom and in communication with said bore, said tubular section disposed for conveying light from said aft located source to the reflecting surface of said double cone prism and for isolating the reflected light from the incident light.

15. A device as set forth in claim 14 in which:
(a) said limiting means includes L-shaped aperture plates,
(b) each of said aperture plates having one leg thereof affixed to a probe element and a second leg extending over said inner face to cover one of said radial slots, and
(c) said second leg having a slit therethrough to form said image.

References Cited by the Examiner
UNITED STATES PATENTS

| | | | |
|---|---|---|---|
| 2,074,753 | 3/37 | McClain | 33—178 |
| 2,497,990 | 2/50 | Huber | 33—178 |

FOREIGN PATENTS 749,147  7/33  France.

ISAAC LISANN, *Primary Examiner*.